United States Patent Office 3,382,078
Patented May 7, 1968

3,382,078
FOOD PACKAGE
Frank A. De Melio, Bound Brook, and George W. Burgess, New Market, N.J., assignors to Union Carbide Corporation, a corporation of New York
No Drawing. Filed Sept. 9, 1963, Ser. No. 307,291
3 Claims. (Cl. 99—171)

This invention relates to styrene polymer compositions providing films and contours having good gloss and sparkle and low haze. More particularly, the invention relates to the prevention of fogging on films of such compositions by condensed moisture, and even more particularly relates to the prevention of moisture fogging on the surfaces of transparent, self-supporting styrene polymer films employed in the packaging of moist food products.

Self-supporting styrene polymer films are characterized by high resistance to moisture vapor transmission. This property is of particular advantage in the packaging of moist foods with these films because the moisture content of the food is thereby substantially retained over long periods of time. Another desirable property of styrene polymer films is their transparency, enabling easy visual identification of food products packaged in such films, coupled with an attractive high sparkle and gloss which is an added merchandising feature over other films such as polyolefins.

Qualitative evidence of the superior resistance of styrene polymer film to moisture vapor transmission is readily observed in the instance of fresh meats such as bacon packaged in such films stored in refrigerators at temperatures above the freezing point of water. Often within an hour of being stored, sufficient water evaporates from the meat surface to saturate the air spaces between the film and the meat, and then begins to condense on the inner surfaces of the styrene polymer film as minute droplets of water. As more water droplets form on the inner styrene polymer surfaces, an overall fogged effect is produced, interfering with visual identification of the meat or other packaged commodity and diminishing package attractiveness.

The use of anti-fog agents heretofore known to be effective in polyolefin films has not imparted anti-fog properties to styrene polymer. For example, the monoglycerides of fat-forming fatty acids or mixtures of monoglycerides and diglycerides of fat-forming acids disclosed in U.S.P. 3,048,263 to W. Sacks et al. to be effective in imparting fog resistance to polyolefins are not effective for this purpose in styrene polymer film compositions when used at levels which permit retention of other desirable properties of the film.

It has been found, however, that such glycerides are effective for imparting increased sparkle and gloss to styrene polymer films and in reducing haze in molded styrene polymer contours and it is an object of the present invention to provide styrene polymer film contours having sparkle and gloss and molded contours having reduced haze. These compositions comprise a normally solid styrene polymer and a monoglyceride or a mixture of a monoglyceride with a diglyceride of fat-forming fatty acids as an additive in a sparkle and gloss improving and haze reducing amount.

Still it is desirable that these compositions form films which are nonfogging as well as high in sparkle and gloss.

Accordingly, it is another object of the present invention to impart to surfaces of styrene polymer films resistance to moisture fogging.

A further object is to provide melt-extrudable styrene polymer compositions, heat-formable into clear, self-supporting films, and particularly characterized by their resistance to surface fogging by humid atmosphere.

It has now been discovered that electrotreatment of a film of a styrene polymer composition surface layer containing monoglycerides of a fat-forming fatty acid or mixtures of monoglycerides and diglycerides of fat-forming fatty acids surprisingly imparts nonfogging properties so that moisture condensing on the surface of the glyceride containing film coalesces into a continuous, transparent film instead of forming a fogged translucent surface comprising individual droplets of water.

The term "fat-forming fatty acids" as herein used, refers to those fatty acids present as such or as glycerides in natural fats. The Yearbook of Agriculture, 1959 Food, U.S. Department of Agriculture, page 716, defines "fat" as follows:

"A glyceryl ester of fatty acids. Fats generally are substances of plant and animal origin. Fat may be in solid form, as butter, margarin, or other shortening, or in liquid form, as the vegetable oils."

The monoglycerides and mixture of monoglycerides and diglycerides useful in the practice of this invention can be prepared by known procedures, as for example, by the glycerolysis of natural fats or oils, these being essentially mixtures of various fatty acid triglycerides. Upon glycerolysis of such oils or fats, there is usually obtained complex mixture of alpha beta monoglycerides, diglycerides, traces of triglycerides and free fatty acids. The components, of such mixtures can be separated by suitable distillation procedures.

Illustrative examples of monoglycerides and mixtures of monoglycerides and diglycerides effective for the purpose of this invention are those obtained by the glycerolysis of such fats or oils as beef tallow, mutton, tallow, butter fat, coconut oil, corn oil, cotton seed oil, lard oil, olive oil, peanut oil, soy bean oil, sesame oil and from their partial or fully hydrogenated derivatives.

In general, the commercially available monoglycerides, or mixtures of mono- and diglycerides of fat-forming fatty acids contain traces of preservatives, such as $\frac{1}{100}$ of 1 percent by weight of butylated hydroxy anisole, $\frac{1}{100}$ of 1 percent by weight of butylated hydroxy toluene, and $\frac{1}{100}$ of 1 percent by weight of citric acid in a propylene glycol carrier added as preservatives. Commercially available products generally will also contain small traces of free glycerine, generally less than 1.5 percent, small traces of free fatty acids, generally less than 0.5 percent, and small traces of the triglycerides of fat-forming fatty acids.

Specific glycerides which can be employed in the compositions of the present invention include, among others:

(1) A mixture of monoglycerides produced by the glycerolysis of fully hydrogenated lard, said mixture being about 65% by weight glyceryl monostearate and about 35% by weight glyceryl monopalmitate. Chemical and physical data on this mixture are as follows:

Monoester content _____ 90.0% (minimum).
Saponification value _____ 155–165.
Iodine value _____ 1.
Glycerol content _____ 1.0% (maximum).
Free fatty acid (as stearic) ____ 1.5% (maximum).
Specific gravity _____ 0.96 at 75° C.
Congealing point _____ 48° C. (approx.).
Clear point _____ 73° C. (approx.).
Balance of contents _____ Diglycerides and trace of triglyceride.

(2) A mixture of monoglycerides containing approximately 63% by weight glyceryl monostearate, 35% by weight glyceryl monopalmitate and 2% by weight of glyceryl monomyristate. The glyceryl monostearate has the following chemical and physical properties:

| | |
|---|---|
| Monoester content | 90.0% (minimum). |
| Saponification value | 158–168. |
| Iodine value | 3 (maximum). |
| Glyceryl content | 1.5% (maximum). |
| Free fatty acid content | 2.5% (maximum). |
| Specific gravity | 0.96 at 75° C. |
| Congealing point | 66° C. (approx.). |
| Clear point | 73° C. (approx.). |
| Balance of contents | Diglycerides and trace of triglycerides. |

(3) Glyceryl monostearate
(4) Glyceryl monopalmitate
(5) Glyceryl monooleate
(6) Glyceryl monolaurate
(7) A mixture of monoglycerides, containing about 93% by weight glyceryl monostearate and 7% by weight of glyceryl monopalmitate, having the following chemical and physical properties:

| | |
|---|---|
| Monoester content | 90.0 (minimum). |
| Saponification value | 155–165. |
| Iodine value | 3 (maximum). |
| Glycerol content | 1% (maximum). |
| Free fatty acid (as stearic) | 1.5% (maximum). |
| Specific gravity | 0.94 at 75° C. |
| Congealing point | 69° C. (approx.). |
| Clear point | 78° C. (approx.). |
| Balance of contents | Diglycerides and trace of triglycerides. |

(8) A mixture of monoglycerides and diglycerides obtained by the glycerolysis of hydrogenated tallow, said mixture containing by weight not more than 1/100 of 1% butylated hydroxyanisole, 1/100 of 1% butylated hydroxytoluene, and 1/100 of 1% citric acid in propylene glycol added as preservatives. Properties of this mixture are as follows:

| | |
|---|---|
| Melting point | 141° F.–144° F. |
| Iodine value | Less than 2. Test method. |
| Monoglyceride content (alpha form) 52–56% | Pohle and Mehlenbacher. |
| Total monoglycerides (alpha and beta forms) 61–66% | J. B. Martin. |
| Free glycerine not over 1.5% | Pohle and Mehlenbacher. |
| Free fatty acid (as oleic) not over 0.5% | A.O.C.S. Ca–5a–40. |
| Moisture not over 0.5% | A.O.C.S. Ca–2e–55. |
| Color not over 5% | Hess-Ives. |
| Balance of contents | Diglycerides and trace of triglycerides. |

(9) A mixture of monoglycerides and diglycerides produced by the glycerolysis of prime stearin lard and containing the same preservatives as described for (8). Properties of this mixture are as follows:

| | |
|---|---|
| Melting point | Approx. 115° F.–122° F. |
| Iodine value | Approx. 56–64. Test method. |
| Monoglyceride content (alpha form) 40–44% | Pohle and Mehlenbacher. |
| Free glycerine not over 0.6% | Pohle and Mehlenbacher. |
| Free fatty acid not over 0.4% (as oleic) | A.O.C.S. Ca–5a–40. |
| Moisture not over 0.4% | A.O.C.S. Ca–2e–55. |
| Color not over 2 | Hess-Ives. |
| Stability at least 5 hrs. | A.O.M. |
| Water Absorption [1] | Cereal Sci. Today, 1, 42 (1956). |
| Balance of contents | Diglycerides and trace of triglycerides. |

[1] Tested at 2½% alpha mono in standard shortening.

(10) A mixture of monoglycerides and diglycerides produced by glycerolysis of hydrogenated soy bean oil. It contains the same amount and kind of preservatives described with respect to the glycerides used in Examples (9) and (10). The properties of this mixture are as follows:

| | |
|---|---|
| Melting point | Approx. 138° F.–142° F. |
| Iodine value | Approx. less than 8. Test method. |
| Monoglyceride content (alpha form) 40–44% | Pohle and Mehlenbacher. |
| Free glycerine not over 1% | Pohle and Mehlenbacher. |
| Free fatty acid not over 0.5% (as oleic) | A.O.C.S. Ca–5a–40. |
| Moisture not over 0.5% | A.O.C.S. Ca–2e–55. |
| Color not over 5 | Hess-Ives. |
| Balance of contents | Diglycerides and trace of triglycerides. |

The incorporation of the glycerides in the styrene polymer is preferred. The incorporation of the monoglycerides or mixtures of monoglycerides and diglycerides of fat-forming fatty acids in styrene polymer to impart to films thereof sparkle and lower haze and gloss to molded articles and to films resistance to moisture fogging in conjunction with electrotreatment can be effected in several ways. In a preferred embodiment, glycerides are homogeneously incorporated into the styrene polymer by heating the polymer and glycerides together to at least the melting point of the styrene polymer in a suitable mixing apparatus, such as a Banbury mixer or heated mixing rolls, until a homogeneous mixture is formed, solidifying the mixture by cooling and then comminuting the cooled mixture to a particle size satisfactory for hot-melt extrusion or equivalent heat-shaping operation, such as molding, to form films or other contours. It will be obvious to those skilled in the art that other methods can also be used to incorporate the glycerides. A coating containing these glycerides can be applied after the styrene polymer film is formed, although the cost of the coating is greater than the cost of incorporation.

The amount of glycerides incorporated in the above-described styrene polymers is that amount which imparts sparkle and gloss, or lowered haze to formed contours, and not more than that which does not appear to further improve the sparkle, gloss or haze properties of the film and/or not more than that which adversely affects the other normally desired physical characteristics of the styrene polymer films produced therefrom. It has been found that if an excess amount of glycerides is incorporated in the styrene polymer films tend to be tacky and have a greasy feel. The blocking and slip properties of the film are also adversely affected.

Thus, to produce a styrene polymer film having a high sparkle and gloss without adversely affecting its other normally desirable properties, the glycerides are generally added in amounts from about 0.4 percent to 3.5 percent based on the weight of the styrene polymer and preferably from about 0.5 percent to 2.0 percent based on the weight of the styrene polymer. Plasticized polystyrene compositions generally require less glyceride than unplasticized compositions for equivalent sparkle, gloss and haze levels.

The optimum concentration of the glyceride in the film forming composition will vary somewhat with the thickness of the film to be made therefrom. Since thinner films have a greater surface area per unit weight of film than thicker films, the higher end of the above range of glyceride will be desirably employed for thinner films than for thicker films. The optimum concentration for each particular thickness of film can be readily determined by simple empirical tests.

The materials normally added to styrene polymer compositions such as fillers, stabilizers, plasticizers, colorants, slip agents, anti-blocking agents, antistatic agents, antioxidants and the like can be added to the compositions of this invention; provided, however, they are present in amounts which will not offset the characteristic improvements in these compositions.

The level of electrotreatment of polystyrene glyceride containing styrene polymer film is generally the level which will impart to unmodified polystyrene film a surface tension of less than about 57 dynes per centimeter.

Thus in the present aspect of the invention, the cooperative, synergistic effect of glycerides and electrotreatment enables the obtaining of nonfogging polystyrene film by levels of electrotreatment and glyceride content either of which alone is ineffective to produce nonfogging film.

Electrotreatment herein refers to subjecting the surface of styrene polymer film to the action of an alternating high frequency voltage stress accompanied by corona discharge. This results in a nonfogging film if there are glycerides incorporated as above described or coated on the surface of the film, although the electrotreatment itself is not carried out in a manner or for a time sufficient to produce, by itself, nonfogging properties.

Electrotreatment is effected by passing the film through a corona aura or subjecting the surface of the film to an electrostatic discharge. Details of the electrostatic discharge treatment of plastic film are described in U.S. Patent 3,018,189 to Traver and U.S. Patent 2,939,956 to Parks which are herewith incorporated by reference.

The compositions of this invention can be extruded into self-sustaining films or extruded or molded into other contours such as fibers, cups, housing and the like or can be coated onto base films or otherwise formed into articles by any of the methods known to the art. Preferably, however, when seamless tubing is desired, the compositions are extruded by the mandrel or the blown-tube method. The polystyrene films herein are transparent and can be biaxially oriented by any method known to the art. Furthermore, films herein can be sealed.

Styrene polymers in the practice of the present invention are normally solid; preferred are film-forming styrene polymers containing a major portion by weight of combined styrene preferably having a Staudinger molecular weight of between 20,000 and 100,000, and especially from 40,000 to 65,000. Styrene copolymers, e.g. with up to 50 percent by weight of acrylonitrile, butadine, olefines, particularly having from 2 to 4 carbon atoms inclusive or other copolymerizable monomers or mixtures of monomers can also be used.

The following examples serve to further illustrate the invention. All parts and percentages are by weight unless otherwise specified.

Example 1.—Gloss and haze improvement

Polystyrene was blended in a twin screw mill with 0.5 percent of a commercial mixture of mono- and diglycerides of fat-forming fatty acids obtained by the glycerolysis of a mixture of beef tallow and lard fat, the latter predominating and having the characteristics described for (1) above.

This composition was dried and subsequently injection molded into plaques measuring 3.5″ x 3.5″ x 0.125″. Control plaques were prepared from the same styrene polymer but without the addition of any glycerides.

Haze was rated upon visual inspection of the plaques. Results were:

Example 1—Virtually haze free, and transparent
Control 1—Definite haze

Example 2.—Fogging resistance improvement

The composition of Example 1 was extruded into tubing and biaxially oriented by the blown tube method. A section of this film was set aside to be tested for fogging (Control II). Another section of the film was electro-treated by subjecting the 4-inch film moving at 130 feet/minute over a polyethylene terephthalate surface to an alternating high frequency voltage stress accompanied by corona discharge using a Lepel high frequency generator at a power setting of 750 watts (Example 2).

The films of Control II and examples were tested for fog resistance by placing the films over 50 cc. of water at 25° C. in a Thwing-Albert cup approximately 3 inches in diameter for 15 minutes, then heating the water to 38° C. and maintaining the film thereover for an additional 15 minutes.

The film of Control II became cloudy and had numerous discrete minute droplets of water. This is poor fogging resistance. The film of Example 2 remained clear, the water thereon forming a nonfoggy, virtually invisible layer with no distinct, minute droplets.

Examples 3–5

Compositions containing polystyrene and 0.5 (Example 3), 1.0 (Example 4), and 2.0 (Example 5) percent of the glycerides of Example 1 were prepared and plaques thereof bioriented to a 1 mil thickness. These films were then treated as in Example 2. All the films were nonfogging. Equivalent results are obtained at 3 and 3.5 percent concentrations of glycerides.

Compositions like those of the preceding examples are prepared using copolymers of styrene with ethylene, proplyene, acrylonitrile and butadiene and acrylonitrile. Nonfogging properties are obtained.

Examples 6–10

A series of compositions was prepared and shaped into one mil film: Details of composition, electrotreatment and final film characteristics are summarized in the table. In all cases the film was treated at 267 feet/minute at the setting shown for the Lepel treater, Model H.F.S.G.–6. This treater employs a spark gap energized primary circuit with time secondary circuit. Adjustable primary inductance is provided to accommodate various load conditions. Maximum input: 5.5 kilowatts, 220 volts, 60 cycles, single phase, unity power factor. Frequency: 250 kilocycles.

TABLE.—TREATER SETTING

| Example/Control [1] | 1 mil film of Polymer | Glyceride, Percent Based on Polymer | Amperes | Watts | Power Control | Power Range | Water Wettability | Non Fogging Property |
|---|---|---|---|---|---|---|---|---|
| III | Polystyrene [2] | 0 | None | | | | Poor | Unsatisfactory |
| IV | do.[2] | 0 | 0.92 | 950 | 6 | 7 | Excellent | Do. |
| V | do.[2] | 0.5 | None | | | | Poor | Do. |
| 6 | do.[2] | 0.5 | 0.92 | 950 | 6 | 7 | Excellent | Satisfactory. |
| 7 | do.[3] | 0.5 | 0.92 | 950 | 6 | 7 | do | Do. |
| VI | do.[2] | 1.0 | None | | | | Poor | Unsatisfactory. |
| 8 | do.[2] | 1.0 | 0.92 | 950 | 6 | 7 | Excellent | Satisfactory. |
| VII | do.[2] | 3.0 | None | | | | Poor | Unsatisfactory. |
| VIII | do.[3] | 0 | None | | | | do | Do. |
| IX | do.[3] | 0 | 0.8 | 500 | 5 | 9 | Excellent | Do. |
| X | do.[3] | 0.5 | None | | | | Poor | Do. |
| XI | do.[3] | 1.0 | None | | | | do | Do. |
| 9 | do.[3] | 1.0 | 1.0 | 1,100 | 6 | 8 | Excellent | Satisfactory. |
| XII | do.[3] | 2.0 | None | | | | Poor | Unsatisfactory. |
| 10 | do.[3] | 2.0 | 1.04 | 1,200 | 6 | 9 | Excellent | Satisfactory. |

[1] Arabic numerals denote Examples. Roman numerals denote Controls.  [2] Plasticized Polystyrene.  [3] Unplasticized Polystyrene.

A consideration of the table reveals that glyceride contents of as little as 0.5 percent are effective in imparting antifogging characteristics when used in conjunction with electrotreatment (Example 6) and that this and other levels of glyceride used alone do not impart antifogging properties (Controls V, VI, VII, X, XI and XII). Moreover use of electrotreatment alone does not improve the antifogging properties of the film although water wettability (determined by wiping the treated film surface with distilled water) and observing whether a continuous film (excellent) or a discontinuous water layer (poor) results was improved over the untreated film (cf. Control III and VIII vs. IV and IX). And further that the same levels of treatment did impart antifog properties when there was a glyceride in the film composition. (Example 6 and Control IV; Example 8 and Control IV.)

The compositions of the present invention are thermoformable by extrusion, molding, fusing and the like into the broad variety of contours commonly known for styrene polymers including but not limited to sheeting, film, cups, containers, bags, panels, coatings and the like. The film of course is particularly desirable as packaging for foodstuffs such as lettuce wrappers or bacon carton windows.

What is claimed is:

1. Foodstuff packaged in a polystyrene film containing from about 0.4 to 3.5 percent by weight based on the weight of the polystyrene of a monoglyceride of a fat forming fatty acid, at least the foodstuff facing surface of said polystyrene film having been subjected to an electrostatic discharge containing corona aura, said electrostatic discharge being of sufficient intensity to impart non-fogging properties to said foodstuff facing surface.

2. A non-fogging container for moisture containing articles comprising a thermoformed styrene polymer containing a major portion by weight combined styrene and having incorporated therein from about 0.4 to 3.5 percent by weight based on the weight of the styrene polymer of a monoglyceride of a fat forming fatty acid, at least the surface of said thermoformed styrene polymer adjacent to the moisture containing article having been subjected to an electrostatic discharge containing corona aura, said electrostatic discharge being of sufficient intensity to impart non-fogging properties to said surface.

3. A non-fogging packaging film adapted for the packaging of moisture containing articles which comprises a film formed from a blend of a styrene polymer containing a major portion by weight combined styrene and from about 0.4 to 3.5 percent by weight based on the weight of the styrene polymer of a monoglyceride of a fat forming fatty acid, at least the article facing surface of said film having been subjected to an electrostatic discharge containing corona aura, said electrostatic discharge being of sufficient intensity to impart non-fogging properties to said foodstuff facing surface.

References Cited

UNITED STATES PATENTS

| | | | |
|---|---|---|---|
| 2,810,933 | 10/1957 | Pierce et al. | 264—22 |
| 2,859,122 | 11/1958 | Maturi et al. | 99—174 |
| 3,048,263 | 8/1962 | Sacks et al. | 206—45.33 |
| 3,157,519 | 11/1964 | Butt | 99—174 |
| 2,713,008 | 7/1955 | Schulenburg | 117—138.5 |
| 3,061,458 | 10/1962 | Arquette et al. | 117—62 |
| 3,062,663 | 11/1962 | Furgal et al. | 99—171 |
| 3,074,798 | 1/1963 | Palmer | 99—174 |

HYMAN LORD, *Primary Examiner.*